(12) United States Patent
Tian et al.

(10) Patent No.: US 11,971,007 B2
(45) Date of Patent: Apr. 30, 2024

(54) POWER CONVERTER HAVING BOOSTING MECHANISM WITH MULTI-SHAFT VERTICALLY STEPPED TURBINE

(71) Applicant: MARINE DYNAMIC (HAINAN FREE TRADE ZONE) NEW ENERGY TECHNOLOGY LIMITED, Sanya (CN)

(72) Inventors: Xiaoming Tian, Sanya (CN); Biao Yang, Sanya (CN)

(73) Assignee: MARINE DYNAMIC (HAINAN FREE TRADE ZONE) NEW ENERGY TECHNOLOGY LIMITED, Sanya (CN)

( * ) Notice: Subject to any disclaimer, the term of this patent is extended or adjusted under 35 U.S.C. 154(b) by 0 days.

(21) Appl. No.: 18/267,465

(22) PCT Filed: Jan. 27, 2021

(86) PCT No.: PCT/CN2021/074013
§ 371 (c)(1),
(2) Date: Jun. 15, 2023

(87) PCT Pub. No.: WO2022/126834
PCT Pub. Date: Jun. 23, 2022

(65) Prior Publication Data
US 2024/0044310 A1 Feb. 8, 2024

(30) Foreign Application Priority Data
Dec. 15, 2020 (CN) .......................... 202011479383.7

(51) Int. Cl.
*F03B 3/12* (2006.01)
*F03B 3/04* (2006.01)
(Continued)

(52) U.S. Cl.
CPC ................ *F03B 3/126* (2013.01); *F03B 3/04* (2013.01); *F03B 11/00* (2013.01); *F03B 13/00* (2013.01);
(Continued)

(58) Field of Classification Search
CPC .. F03B 3/04; F03B 3/126; F03B 13/00; F03D 1/02; F01D 1/24; F01D 1/26
See application file for complete search history.

(56) References Cited

U.S. PATENT DOCUMENTS

| 1,615,619 A | 1/1927 | Finne |
| 4,464,095 A | 8/1984 | Iida |
| 2011/0012361 A1 | 1/2011 | Lee |

FOREIGN PATENT DOCUMENTS

| CN | 102953899 A | 3/2013 |
| CN | 104514666 A | 4/2015 |

(Continued)

*Primary Examiner* — Christopher R Legendre
(74) *Attorney, Agent, or Firm* — Bayramoglu Law Offices LLC

(57) ABSTRACT

A power converter having a boosting mechanism with a multi-shaft vertically stepped turbine includes: a shaft sleeve, a water inlet end base, an outer sleeve, a plurality of first stepped turbine units, a plurality of first shaft rods, a plurality of second stepped turbine units, a plurality of second shaft rods and a third shaft rod. The first stepped turbine unit is located above the second stepped turbine unit. The second stepped turbine units and the first stepped turbine units rotate in opposite directions. During a drainage process, water flows move in opposite directions and collide with each other to increase a water pressure. Due to the increase in the water pressure, rotational speeds of the first stepped turbine units and the second stepped turbine units increase, and rotational speeds of the first shaft rods and the second shaft rods correspondingly increase.

8 Claims, 5 Drawing Sheets

(51) Int. Cl.
*F03B 11/00* (2006.01)
*F03B 13/00* (2006.01)

(52) U.S. Cl.
CPC .................. *F05B 2220/706* (2013.01); *F05B 2260/40311* (2013.01)

(56) References Cited

FOREIGN PATENT DOCUMENTS

| | | | |
|---|---|---|---|
| CN | 109915303 A | 6/2019 | |
| CN | 210003446 U | 1/2020 | |
| WO | WO-2011145762 A1 * | 11/2011 | ............... F01D 1/26 |
| WO | 2012021951 A1 | 2/2012 | |
| WO | 2020162766 A1 | 8/2020 | |

\* cited by examiner

US 11,971,007 B2

POWER CONVERTER HAVING BOOSTING MECHANISM WITH MULTI-SHAFT VERTICALLY STEPPED TURBINE

CROSS REFERENCE TO THE RELATED APPLICATIONS

This application is the national phase entry of International Application No. PCT/CN2021/074013, filed on Jan. 27, 2021, which is based upon and claims priority to Chinese Patent Application No. 202011479383.7, filed on Dec. 15, 2020, the entire contents of which are incorporated herein by reference.

TECHNICAL FIELD

The present disclosure relates to the technical field of boosting power devices, and in particular to a power converter having a boosting mechanism with a multi-shaft vertically stepped turbine.

BACKGROUND

A turbocharger is an air compressor driven by a structure including two coaxial impellers through the exhaust gas generated in operation of an internal combustion engine. Similar to a supercharger, the turbocharger can increase the air flow into the internal combustion engine or boiler, so as to improve the combustion efficiency. The turbocharger is commonly found in an automotive engine, where it uses the heat and flow of the exhaust gas to increase the output power of the internal combustion engine or improve fuel economy at the same output power.

However, the turbocharger is not suitable for a hydroelectric generator. Therefore, it is highly desirable to develop a device for increasing the efficiency of the hydroelectric generator by using hydraulic power, in order to resolve most if not all of the problems existing in the prior art.

SUMMARY

The "Summary" section introduces a series of simplified concepts, which will be further elaborated in the "Detailed Description of The Embodiments" section. The "Summary" section of the present disclosure is not intended to limit the key and necessary technical features of the claimed technical solution or define the scope of protection of the claimed technical solution.

In order to resolve most if not all of the problems, the present disclosure provides a power converter having a boosting mechanism with a multi-shaft vertically stepped turbine. The power converter includes: a shaft sleeve, a water inlet end base, an outer sleeve, a plurality of first stepped turbine units, a plurality of first shaft rods, a plurality of second stepped turbine units, a plurality of second shaft rods and a third shaft rod, where the water inlet end base is provided on an upper end of the outer sleeve; the shaft sleeve is provided inside the outer sleeve, and an upper end of the shaft sleeve extends out of the water inlet end base; the water inlet end base is provided with a plurality of water inlet holes; the first shaft rods, the second shaft rods and the third shaft rod are nested inside the shaft sleeve; the third shaft rod is provided in a central part of the shaft sleeve; the plurality of first shaft rods and the plurality of second shaft rods are alternately and uniformly distributed around the third shaft rod; the plurality of first stepped turbine units are sequentially arranged on the first shaft rods and the second shaft rods from top to bottom; the first stepped turbine units are drivingly connected to the first shaft rods, and are rotatably connected to the second shaft rods; the plurality of second stepped turbine units are sequentially arranged on the first shaft rods and the second shaft rods from top to bottom; the second stepped turbine units are drivingly connected to the second shaft rods, and are rotatably connected to the first shaft rods; the first stepped turbine unit is located above the second stepped turbine unit; and the second stepped turbine units and the first stepped turbine units rotate in opposite directions.

Preferably, the plurality of first shaft rods are arranged; each of the first stepped turbine units includes a first gear set, a first triangular stepped gear base, a first gear sleeve, and a plurality of first blades with zero-clearance full-round projection; the first gear set includes a plurality of first internal gears; the plurality of first internal gears are arranged on the first triangular stepped gear base; the first shaft rods respectively pass through the first internal gears; the second shaft rods respectively pass through a plurality of first connecting holes of the first triangular stepped gear base; the third shaft rod passes through a first central hole of the first triangular stepped gear base; the first gear sleeve is sleeved on the periphery of the plurality of first internal gears; and the plurality of first blades are arranged on the first gear sleeve.

Preferably, the first triangular stepped gear base includes a first base ring and a first stepped base; the first stepped base is provided on the first base ring; the first stepped base includes a central part provided with the first central hole and a circumferential part uniformly provided with the plurality of first connecting holes; a first open groove is provided between each two adjacent first connecting holes; and the first internal gear is provided in the first open groove.

Preferably, each of the second stepped turbine units includes a second gear set, a second triangular stepped gear base, a second gear sleeve, and a plurality of second blades with zero-clearance full-round projection; the second gear set includes a plurality of second internal gears; the plurality of second internal gears are arranged on the second triangular stepped gear base; the second shaft rods respectively pass through the second internal gears; the first shaft rods respectively pass through a plurality of second connecting holes of the second triangular stepped gear base; the third shaft rod passes through a second central hole of the second triangular stepped gear base; the second gear sleeve is sleeved on the periphery of the plurality of second internal gears; the plurality of second blades are arranged on the second gear sleeve; and the second blades are arranged in reverse symmetry with the first blades.

Preferably, the second triangular stepped gear base includes a second base ring and a second stepped base; the second stepped base is provided on the second base ring; the second stepped base includes a central part provided with the second central hole and a circumferential part uniformly provided with the plurality of second connecting holes; a second open groove is provided between each two adjacent second connecting holes; and the second internal gear is provided in the second open groove.

Preferably, the power converter further includes a first output mechanism; the first output mechanism includes the first gear set, the first triangular stepped gear base, the first gear sleeve, and a plurality of first helical gear sleeves; the first gear set includes the plurality of first internal gears; the plurality of first internal gears are arranged on the first triangular stepped gear base; the first shaft rods respectively pass through the first internal gears; the second shaft rods respectively pass through the plurality of first connecting holes of the first triangular stepped gear base; the third shaft rod passes through a first central hole of the first triangular stepped gear base; the first gear sleeve is sleeved on the periphery of the plurality of first internal gears; and the plurality of first helical gear sleeves are arranged on the first gear sleeve.

Preferably, the power converter further includes a second output mechanism; the second output mechanism includes the second gear set, the second triangular stepped gear base, the second gear sleeve, and a plurality of second helical gear sleeves; the second gear set includes a plurality of second internal gears; the plurality of second internal gears are arranged on the second triangular stepped gear base; the second shaft rods respectively pass through the second internal gears; the first shaft rods respectively pass through the plurality of second connecting holes of the second triangular stepped gear base; the third shaft rod passes through the second central hole of the second triangular stepped gear base; the second gear sleeve is sleeved on the periphery of the plurality of second internal gears; and the plurality of second helical gear sleeves are arranged on the second gear sleeve.

Preferably, a top base is provided at upper ends of the first shaft rods, the second shaft rods and the third shaft rod, and a bottom base is provided at lower ends of the first shaft rods, the second shaft rods and the third shaft rod.

Compared with the prior art, the present disclosure has at least the following beneficial effects.

The present disclosure provides a power converter having a boosting mechanism with a multi-shaft vertically stepped turbine. The power converter includes the shaft sleeve, the water inlet end base, the outer sleeve, the plurality of first stepped turbine units, the plurality of first shaft rods, the plurality of second stepped turbine units, the plurality of second shaft rods, and the third shaft rod. The first stepped turbine units and the second stepped turbine units are designed in reverse structures. During a drainage process, water flows move in opposite directions and collide with each other to increase a water pressure. Due to the increase in the water pressure, rotational speeds of the first stepped turbine units and the second stepped turbine units increase, and rotational speeds of the first shaft rods and the second shaft rods correspondingly increase. In this way, two groups of power are output to a hydroelectric generator, thus improving the working efficiency of the hydroelectric generator.

Other advantages, objectives, and features of the power converter having a boosting mechanism with a multi-shaft vertically stepped turbine according to the present disclosure will be partially embodied through the following description, and partially understood by those skilled in the art through the research and practice of the present disclosure.

BRIEF DESCRIPTION OF THE DRAWINGS

The drawings are provided for further understanding of the present disclosure and constitute a part of the specification. The drawings, together with the embodiments of the present disclosure, are intended to explain the present disclosure, rather than to limit the present disclosure. In the drawings.

DETAILED DESCRIPTION OF THE EMBODIMENTS

The present disclosure will be further described in detail below with reference to the drawings and embodiments, such that those skilled in the art can implement the present disclosure with reference to the description.

It should be understood that the terms, such as "have", "include" and "comprise" as used herein, do not exclude the presence or addition of one or more other elements or a combination thereof.

Figure 1:
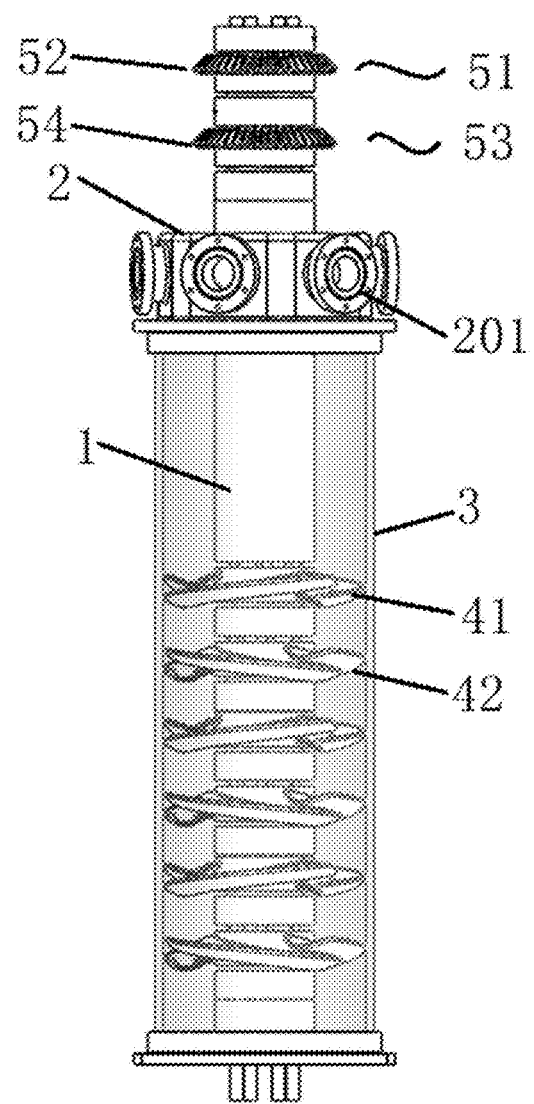
FIG. 1 is a structural diagram of a power converter having a boosting mechanism with a multi-shaft vertically stepped turbine according to the present disclosure.
Figure 2:
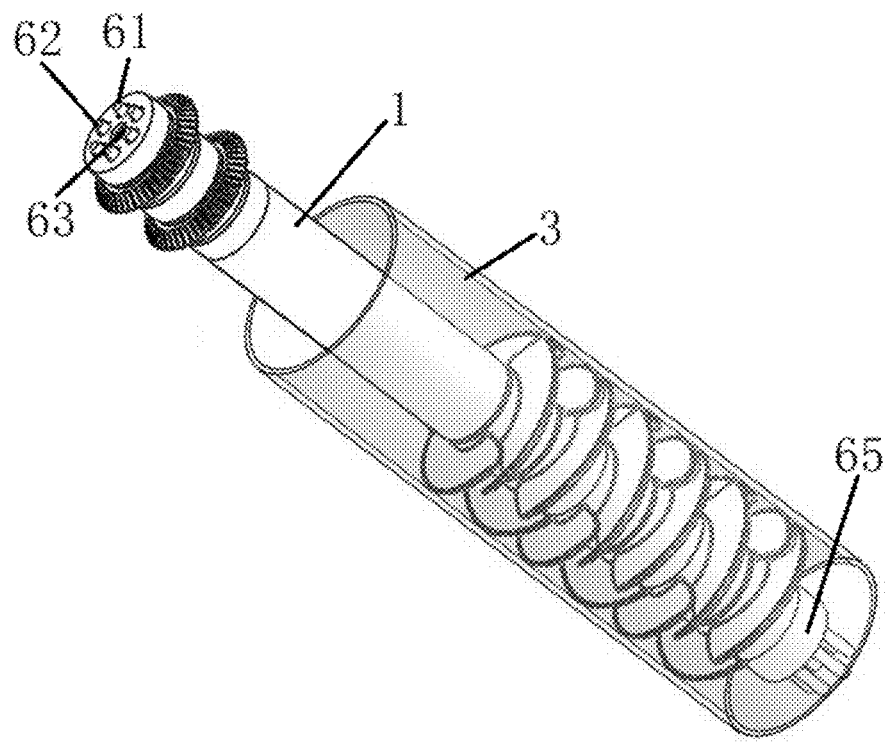
FIG. 2 is a partial structural diagram of the power converter having a boosting mechanism with a multi-shaft vertically stepped turbine according to the present disclosure.
Figure 3:
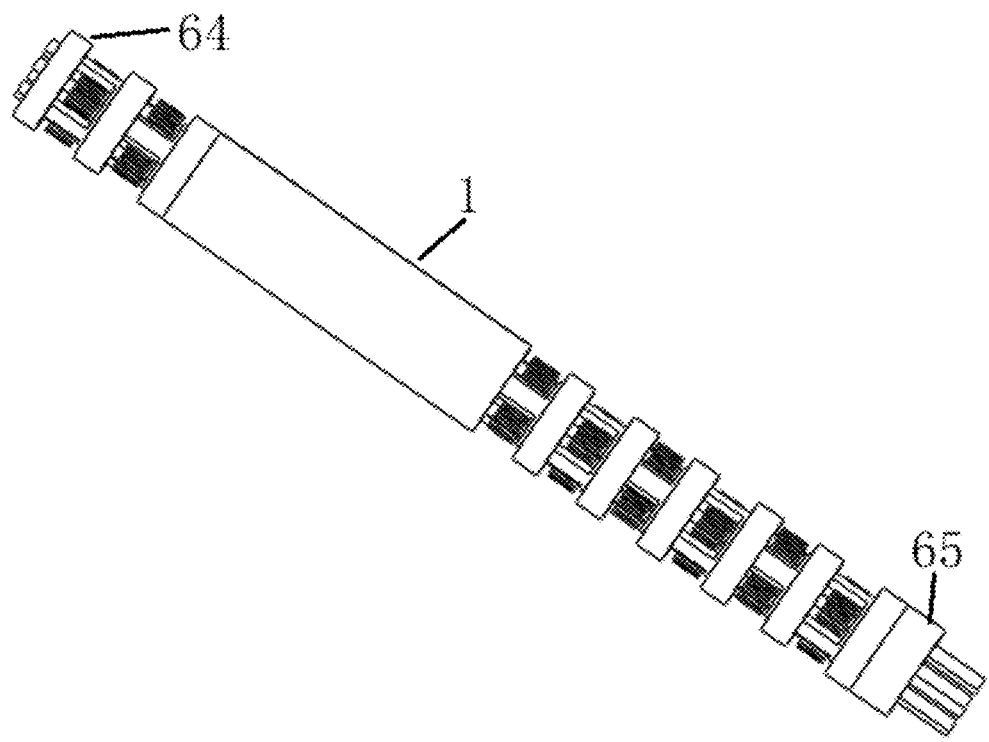
FIG. 3 is a structural diagram of a stepped turbine-based boosting mechanism according to the present disclosure.
Figure 4:
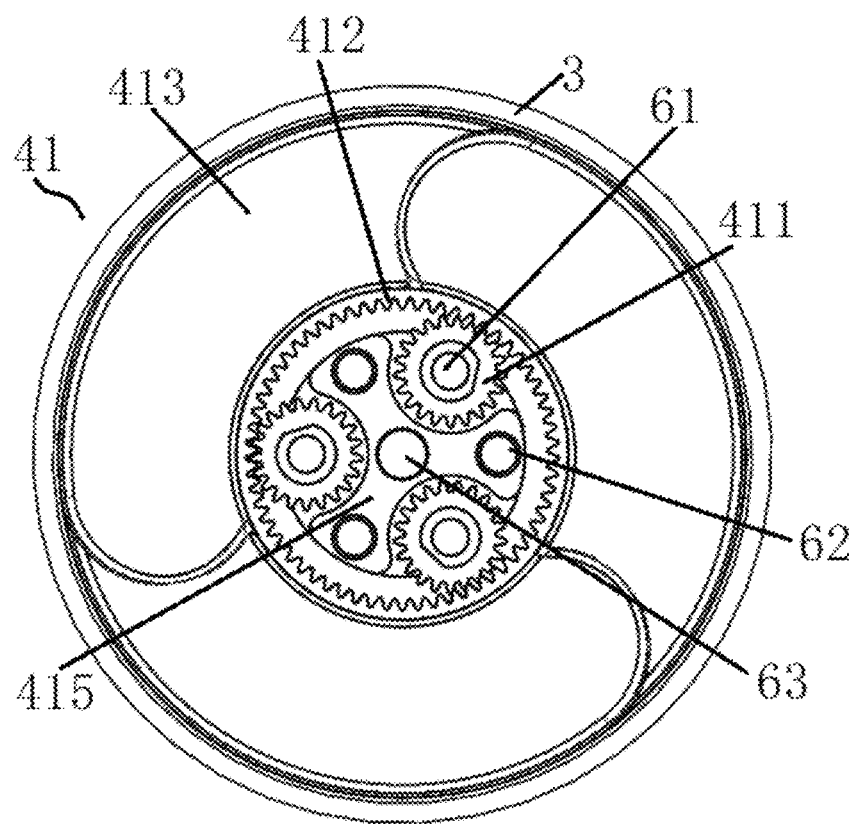
FIG. 4 is a structural diagram of a first stepped turbine unit according to the present disclosure.
Figure 5:
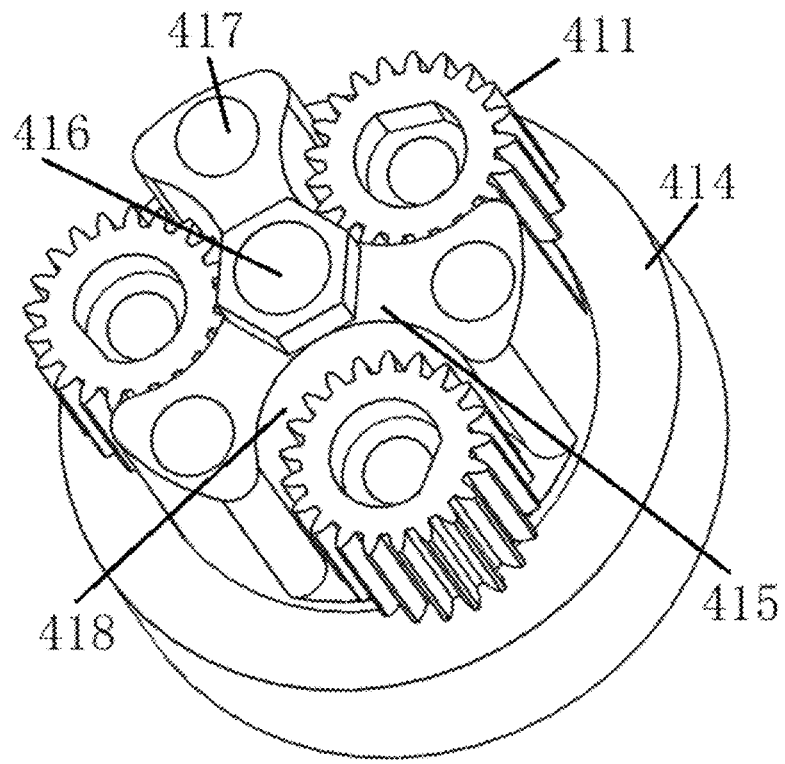
FIG. 5 is a structural diagram of a first triangular stepped gear base according to the present disclosure.
Figure 6:
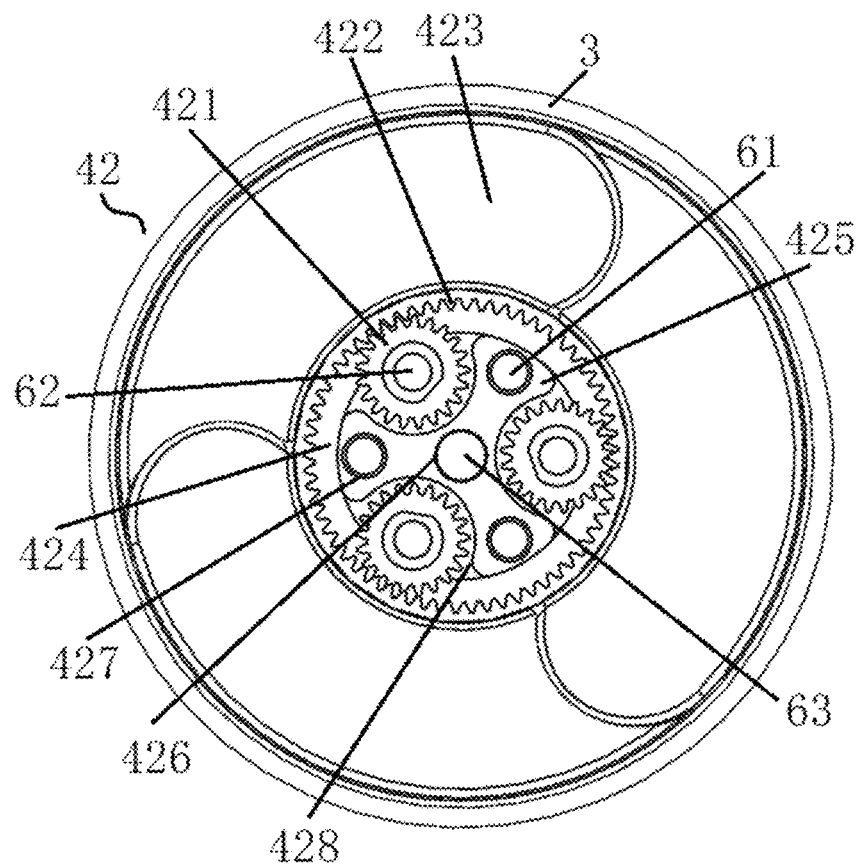
FIG. 6 is a structural diagram of a second stepped turbine unit according to the present disclosure.
Figure 7:
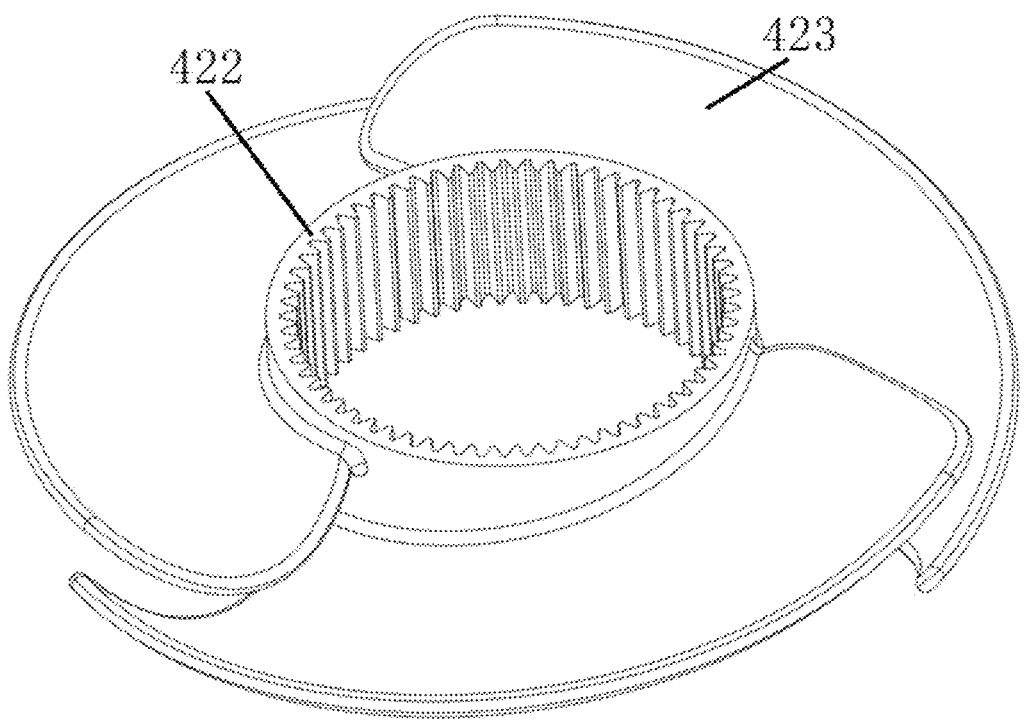
FIG. 7 is a structural diagram of second blades with zero-clearance full-round projection according to the present disclosure.
Figure 8:
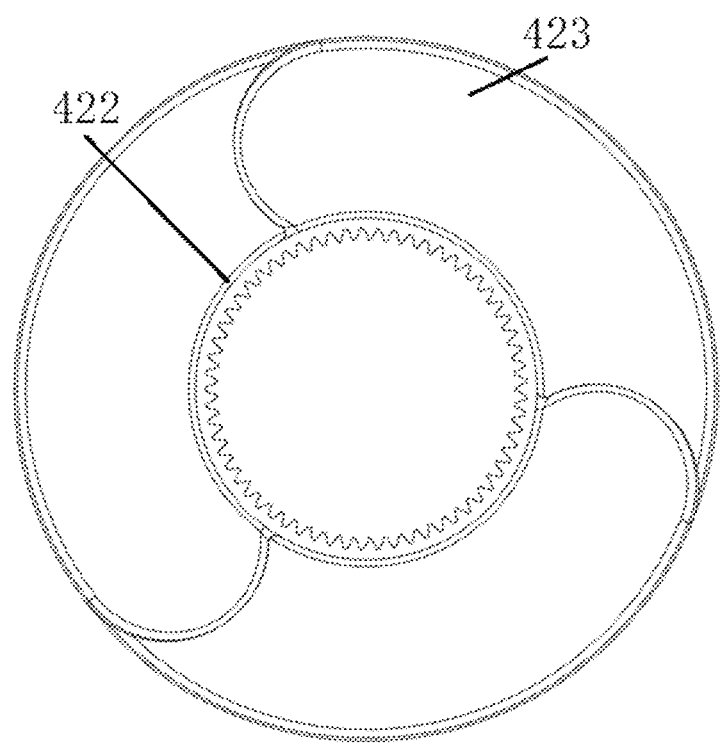
FIG. 8 is a structural diagram of a second gear sleeve according to the present disclosure.
Figure 9:
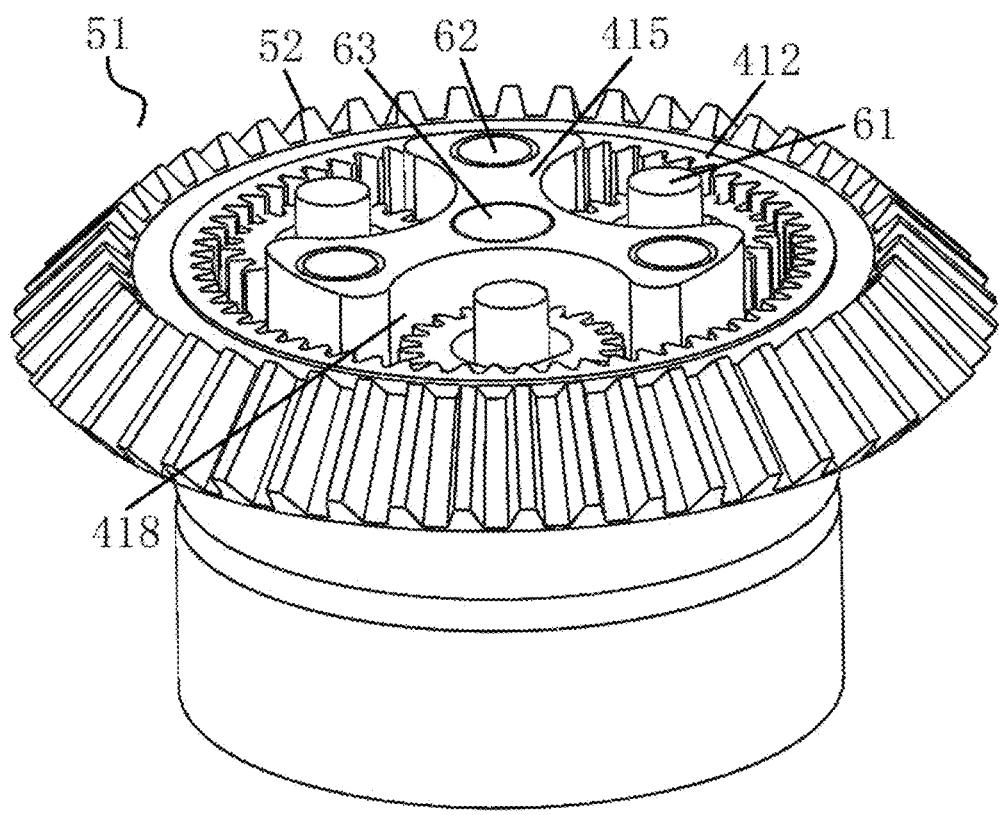
FIG. 9 is a structural diagram of a first output mechanism according to the present disclosure.

As shown in FIGS. 1 to 9, the present disclosure provides a power converter having a boosting mechanism with a multi-shaft vertically stepped turbine.

The power converter includes: shaft sleeve 1, water inlet end base 2, outer sleeve 3, a plurality of first stepped turbine units 41, a plurality of first shaft rods 61, a plurality of second stepped turbine units 42, a plurality of second shaft rods 62, and third shaft rod 63. The water inlet end base 2 is provided on an upper end of the outer sleeve 3. The shaft sleeve 1 is provided inside the outer sleeve 3, and an upper end of the shaft sleeve 1 extends out of the water inlet end base 2. The water inlet end base 2 is provided with a plurality of water inlet holes 201. The first shaft rods, the second shaft rods and the third shaft rod 63 are nested inside the shaft sleeve 1. The third shaft rod 63 is provided in a central part of the shaft sleeve 1. The plurality of first shaft rods 61 and the plurality of second shaft rods 62 are alternately and uniformly distributed around the third shaft rod 63. The plurality of first stepped turbine units 41 are sequentially arranged on the first shaft rods 61 and the second shaft rods 62 from top to bottom. The first stepped turbine units 41 are drivingly connected to the first shaft rods 61, and are rotatably connected to the second shaft rods 62. The plurality of second stepped turbine units 42 are sequentially arranged on the first shaft rods and the second shaft rods from top to bottom. The second stepped turbine units 42 are drivingly connected to the second shaft rods, and are rotatably connected to the first shaft rods. The first stepped turbine unit 41 is located above the second stepped turbine unit 42, and the second stepped turbine units 42 and the first stepped turbine units 41 rotate in opposite directions.

A working principle of the above technical solution is as follows. In the present disclosure, the power converter is vertically connected to an input end of a hydraulic/steam engine during operation. Specifically, the power converter includes the shaft sleeve 1, the water inlet end base 2, the outer sleeve 3, the plurality of first stepped turbine units 41, the plurality of first shaft rods 61, the plurality of second stepped turbine units 42, the plurality of second shaft rods 62, and the third shaft rod 63. The water inlet end base 2 is provided with the plurality of water inlet holes 201. The water inlet holes 201 are connected to a water supply pipe. The water supply pipe conveys water to the outer sleeve 3 through the water inlet holes 201. Under the action of gravity, the water flows downwards and impacts the plurality of first stepped turbine units 41 and the plurality of second stepped turbine units 42 located below the shaft sleeve 1 in the outer sleeve 3. For example, there are three first stepped turbine units 41 and three second stepped turbine units 42. The first stepped turbine unit 41 is located above the second stepped turbine unit 42. That is, the three first stepped turbine units 41 and the three second stepped turbine units 42 in a vertical direction are arranged alternately with each other. That is to say, the first stepped turbine units 41 are respectively arranged at layers "1", "3", and "5", and the second stepped turbine units 42 are respectively arranged at layers "2", "4", and "6". The second stepped turbine units 42 and the first stepped turbine units 41 are designed in reverse structures. Under the action of water impact, the first stepped turbine units 41 located at the layers "1", "3", and "5" are rotated in a same direction, such as clockwise, while the second stepped turbine units 42 located at the layers "2", "4", and "6" are rotated in another direction, such as counterclockwise. Thus, during a drainage process, when the first stepped turbine units 41 and the second stepped turbine units 42 rotate in opposite directions, water flows move in opposite directions and collide with each other. The three first stepped turbine units 41 are rotated synchronously through the plurality of first shaft rods 61 to fully absorb the potential energy and gravity energy of the water flow, thereby improving the working efficiency of the hydraulic/steam engine. Similarly, the three second stepped turbine units 42 are rotated synchronously through the plurality of second shaft rods 62 to absorb the potential energy and gravity energy of the water flow, thereby improving the working efficiency of the hydraulic/steam engine.

The above technical solution has the following beneficial effects. Through the above structural design, the power converter includes the shaft sleeve 1, the water inlet end base 2, the outer sleeve 3, the plurality of first stepped turbine units 41, the plurality of first shaft rods 61, the plurality of second stepped turbine units 42, the plurality of second shaft rods 62, and the third shaft rod 63. The first stepped turbine units 41 and the second stepped turbine units 42 are designed in reverse structures. During a drainage process, the water flows move in opposite directions and collide with each other to increase a water pressure. Due to the increase in the water pressure, rotational speeds of the first stepped turbine units 41 and the second stepped turbine units 42 increase, and rotational speeds of the first shaft rods 61 and the second shaft rods 62 correspondingly increase. In this way, two groups of power are output to the hydroelectric generator, thus improving the working efficiency of the hydroelectric generator.

In an embodiment, each of the first stepped turbine units 41 includes a first gear set, a first triangular stepped gear base, first gear sleeve 412, and a plurality of first blades 413 with zero-clearance full-round projection. The first gear set includes a plurality of first internal gears 411. The plurality of first internal gears 411 are arranged on the first triangular stepped gear base. The first shaft rods 61 respectively pass through the first internal gears 411. The second shaft rods 62 respectively pass through a plurality of first connecting holes 417 of the first triangular stepped gear base. The third shaft rod 63 passes through first central hole 416 of the first triangular stepped gear base. The first gear sleeve 412 is sleeved on the periphery of the plurality of first internal gears 411. The plurality of first blades 413 are arranged on the first gear sleeve 412.

A working principle of the above technical solution is as follows. In this embodiment, there are three first shaft rods 61 arranged in an equilateral triangular distribution around the third shaft rod 63 at an interval of 120°. There are three second shaft rods 62 arranged in an equilateral triangular distribution around the third shaft rod 63 with an interval of 120°. That is to say, the three first shaft rods 61 and the three second shaft rods 62 are alternately distributed around the third shaft rod 63.

Specifically, the first stepped turbine units 41 each include the first gear set, the first triangular stepped gear base, the first gear sleeve 412, and the plurality of first blades 413. The plurality of first blades 413 are diagonally distributed along an outer wall of the first gear sleeve 412. The water impacting from above drives the plurality of first blades 413 to rotate. The first blades 413 drive the first gear sleeve 412 to rotate. The first gear sleeve 412 drives the plurality of first internal gears 411 on the first triangular stepped gear base to rotate. There are three first internal gears 411 arranged. Since the first shaft rods 61 pass through the first internal gears 411, when the first internal gears 411 are rotated, they drive the first shaft rods 61 to rotate. The water flows through the first stepped turbine unit 41 to reach the second stepped turbine unit 42. The rotation direction of the second stepped turbine unit 42 is opposite to that of the first stepped turbine unit 41. Therefore, the first stepped turbine unit 41 drives the second shaft rod 62 to rotate. That is to say, the rotation direction of the first shaft rod 61 is opposite to that of the second shaft rod 62. The first stepped turbine units 41 located at the layers "1", "3", and "5" act on the three first shaft rods 61 in the triangular distribution to fully absorb the potential energy and gravity energy of the water flow, and the three first shaft rods 61 in the vertical direction output the power.

It should be noted that in addition to the above case, there may also be 9 or 12 first shaft rods 61 or second shaft rods 62, which will not be further described herein.

The above technical solution has the following beneficial effects. Through the above structural design, this embodiment provides a structure of the first stepped turbine unit 41. The first stepped turbine unit 41 includes the first gear set, the first triangular stepped gear base, the first gear sleeve 412, and the plurality of first blades 413. Through the above structure, specifically, the first stepped turbine unit 41 and the second stepped turbine unit 42 allow the water flows to move in opposite directions and collide with each other during the drainage process, thereby increasing the water pressure. Due to the increase in the water pressure, the rotational speeds of the first stepped turbine unit 41 and the second stepped turbine unit 42 increase, thereby improving the working efficiency of the hydroelectric generator.

In an embodiment, the first triangular stepped gear base includes first base ring 414 and first stepped base 415. The first stepped base 415 is provided on the first base ring 414. The first stepped base 415 includes a central part provided with the first central hole 416 and a circumferential part uniformly provided with the plurality of first connecting holes 417. First open groove 418 is provided between each two adjacent first connecting holes 417. The first internal gear 411 is provided in the first open groove 418.

A working principle of the above technical solution is as follows. This embodiment provides a structure of the first triangular stepped gear base. The first triangular stepped gear base includes the first base ring 414 and the first stepped base 415. Specifically, the first stepped base 415 is provided on the first base ring 414. In order to provide the three first internal gears 411, three corresponding first open grooves 418 are arranged in the first stepped base 415. The first internal gear 411 is provided in the first open groove 418. The first stepped base 415 is provided with the first central hole 416 and the three first connecting holes 417, which are respectively connected to the third shaft rod 63 and the second shaft rods 62. The first internal gear 411 is connected to the first shaft rod 61.

The above technical solution has the following beneficial effects. Through the above structural design, this embodiment provides a structure of the first triangular stepped gear base. The first triangular stepped gear base includes the first base ring 414 and the first stepped base 415. The first central hole 416 is provided in the first stepped base 415. The first triangular stepped gear base can be fixed to the third shaft rod 63 to avoid interference between the first stepped turbine unit 41 and the second stepped turbine unit 42. The three first shaft rods 61 are designed in a triangular distribution, and the three second shaft rods 62 are also designed in a triangular distribution. This triangular shaft design features a stable mechanical structure, uniform force distribution, and multi-point torque transfer. In addition, the design of the three first internal gears 411 in the first stepped turbine unit 41 can achieve full absorption of gravity energy.

In an embodiment, each of the second stepped turbine units 42 includes a second gear set, a second triangular stepped gear base, second gear sleeve 422, and a plurality of second blades 423 with zero-clearance full-round projection. The second gear set includes a plurality of second internal gears 421. The plurality of second internal gears 421 are arranged on the second triangular stepped gear base. The second shaft rods 62 respectively pass through the second internal gears 421. The first shaft rods 61 respectively pass through a plurality of second connecting holes 427 of the second triangular stepped gear base. The third shaft rod 63 passes through second central hole 426 of the second triangular stepped gear base. The second gear sleeve 422 is sleeved on the periphery of the plurality of second internal gears 421. The plurality of second blades 423 are arranged on the second gear sleeve 422. The second blades 423 are arranged in reverse symmetry with the first blades 413.

A working principle of the above technical solution is as follows. This embodiment provides a structure of the second stepped turbine unit 42. The second stepped turbine units 42 each include the second gear set, the second triangular stepped gear base, the second gear sleeve 422, and the plurality of second blades 423.

The plurality of second blades 423 are diagonally distributed along an outer wall of the second gear sleeve 422. The water flows through the first blades 413 to impact the second blades 423, pushing the second blade 423 to rotate. The second blades 423 drive the second gear sleeve 422 to rotate. The second gear sleeve 422 drives the plurality of second internal gears 421 on the second triangular stepped gear base to rotate. There are three second internal gears 421. The second shaft rods 62 respectively pass through the second internal gear 421. When the second internal gears 421 are rotated, they drive the second shaft rod 62 to rotate. The second blades 423 and the first blades 413 are designed in reverse structures. Thus, the rotation direction of the second blades 423 is opposite to that of the first blades 413. That is to say, the rotation direction of the second shaft rods 62 is opposite to that of the first shaft rods 61, thereby driving output mechanism 5 to rotate. When the output mechanism 5 is rotated, it outputs two torques in opposite directions to two hydraulic engines.

The above technical solution has the following beneficial effects. Through the above structural design, this embodiment provides a structure of the second stepped turbine unit 42. The second stepped turbine unit 42 includes the second gear set, the second triangular stepped gear base, the second gear sleeve 422, and the plurality of second blades 423. The second stepped turbine unit cooperates with the first stepped turbine unit 41. Specifically, during the drainage process, stepped turbine-based boosting mechanism 4 drives the water flows to move in opposite directions and collide with each other so as to increase water pressure. Due to the increase in the water pressure, a rotational speed of the stepped turbine-based boosting mechanism 4 increases, and a rotational speed of a transmission shaft mechanism increases accordingly. In this way, a rotational speed of the output mechanism increases, thereby improving the working efficiency of the hydroelectric generator.

In an embodiment, the second triangular stepped gear base includes second base ring 424 and second stepped base 425. The second stepped base 425 is provided on the second base ring 424. The second stepped base 425 includes a central part provided with the second central hole 426 and a circumferential part uniformly provided with the plurality of second connecting holes 427. Second open groove 428 is provided between each two adjacent second connecting holes 427. The second internal gear 421 is provided in the second open groove 428.

A working principle of the above technical solution is as follows. This embodiment provides a structure of the second triangular stepped gear base. The second triangular stepped gear base includes the second base ring 424 and the second stepped base 425. Specifically, the second stepped base 425 is provided on the second base ring 424. In order to provide the three second internal gears 421, three corresponding second open grooves 428 are arranged in the second stepped base 425. The second internal gear 421 is provided in the second open groove 428. The second stepped base 425 is provided with the second central hole 426 and the three second connecting holes 427, which are respectively connected to the third shaft rod 63 and the second shaft rods 62. The second internal gear 421 is connected to the first shaft rod 61.

The above technical solution has the following beneficial effects. Through the above structural design, this embodiment provides a structure of the second triangular stepped gear base. The second triangular stepped gear base includes the second base ring 424 and the second stepped base 425. The second central hole 426 is provided in the second stepped base 425. The second triangular stepped gear base can be fixed to the third shaft rod 63 to avoid interference between the first stepped turbine unit 41 and the second stepped turbine unit 42. The three first shaft rods 61 are designed in a triangular distribution, and the three second shaft rods 62 are also designed in a triangular distribution. This triangular shaft design features a stable mechanical structure, uniform force distribution, and multi-point torque transfer. In addition, the design of the three second internal gears 421 in the second stepped turbine unit 42 can achieve full absorption of gravity energy.

In an embodiment, the power converter further includes first output mechanism 51. The first output mechanism 51 includes the first gear set, the first triangular stepped gear base, the first gear sleeve 412, and a plurality of first helical gear sleeves 52. The first gear set includes the plurality of first internal gears 411. The plurality of first internal gears 411 are arranged on the first triangular stepped gear base. The first shaft rods 61 respectively pass through the first internal gears 411. The second shaft rods 62 respectively pass through the plurality of first connecting holes 417 of the first triangular stepped gear base. The third shaft rod 63 passes through first central hole 416 of the first triangular stepped gear base. The first gear sleeve 412 is sleeved on the periphery of the plurality of first internal gears 411. The plurality of first helical gear sleeves 52 are arranged on the first gear sleeve 412.

A working principle of the above technical solution is as follows. The plurality of first stepped turbine units 41 inside the outer sleeve 3 are rotated under the action of the water flow, thereby driving the plurality of first shaft rods 61 to rotate. The plurality of first shaft rods 61 drive the first output mechanism 51 to output the power. Specifically, the structure of the first output mechanism 51 is similar to that of the first stepped turbine unit 41. This embodiment provides the structure of the first output mechanism 51. In this structure, the first output mechanism 51 includes the first gear set, the first triangular stepped gear base, the first gear sleeve 412, and the plurality of first helical gear sleeves 52. When the first shaft rods 61 are rotated, they drive the first internal gears 411 in the first output mechanism 51 to rotate. The first internal gears 411 drive the first gear sleeve 412 to rotate. The first gear sleeve 412 is provided with the plurality of first helical gear sleeves 52, and the plurality of first helical gear sleeves 52 output the power.

The above technical solution has the following beneficial effects. Through the above structural design, this embodiment provides the structure of the first output mechanism 51, which specifically realizes the power output process of the power converter.

In an embodiment, the power converter further includes second output mechanism 53. The second output mechanism 53 includes the second gear set, the second triangular stepped gear base, the second gear sleeve 422, and a plurality of second helical gear sleeves 54. The second gear set includes a plurality of second internal gears 421. The plurality of second internal gears 421 are arranged on the second triangular stepped gear base. The second shaft rods 62 respectively pass through the second internal gears 421. The first shaft rods 61 respectively pass through the plurality of second connecting holes 427 of the second triangular stepped gear base. The third shaft rod 63 passes through the second central hole 426 of the second triangular stepped gear base. The second gear sleeve 422 is sleeved on the periphery of the plurality of second internal gears 421. The plurality of second helical gear sleeves 54 are arranged on the second gear sleeve 422.

A working principle of the above technical solution is as follows. The plurality of second stepped turbine units 42 inside the outer sleeve 3 are rotated under the combined action of the first stepped turbine units 41 and the water flow, thereby driving the plurality of second shaft rods 62 to rotate. The plurality of second shaft rods 62 drive the second output mechanism 53 to output the power. Specifically, the structure of the second output mechanism 53 is similar to that of the second stepped turbine unit 42. This embodiment provides the structure of the second output mechanism 53. In this structure, the second output mechanism 53 includes the second gear set, the second triangular stepped gear base, the second gear sleeve 422, and the plurality of second helical gear sleeves 54. When the second shaft rods 62 are rotated, they drive the second internal gears 421 in the second output mechanism 53 to rotate. The second internal gears 421 drive the second gear sleeve 422 to rotate. The second gear sleeve 422 is provided with the plurality of second helical gear sleeves 54, and the plurality of second helical gear sleeves 54 output power.

The above technical solution has the following beneficial effects. Through the above structural design, this embodiment provides the structure of the second output mechanism 53. Specifically, the second output mechanism 53 cooperates with the first output mechanism 51 to realize the double-power output process of the power converter and ensure the output capacity of the power converter.

In an embodiment, top base 64 is provided at upper ends of the first shaft rods 61, the second shaft rods 62 and the third shaft rod 63, and bottom base 65 is provided at lower ends of the first shaft rods 61, the second shaft rods 62 and the third shaft rod 63.

A working principle and beneficial effects of the above technical solution are as follows. In order to fix the first output mechanism 51 so as to prevent it from leaving the first shaft rods 61, the second shaft rods 62 and the third shaft rod 63, the top base 64 is provided at the upper ends of the first shaft rods 61, the second shaft rods 62 and the third shaft rod 63. In order to fix the lowest second stepped turbine unit 42 so as to prevent it from leaving the first shaft rods 61, the second shaft rods 62 and the third shaft rod 63, the bottom base 65 is provided at the lower ends of the first shaft rods 61, the second shaft rods 62 and the third shaft rod 63.

In the description of the present disclosure, the terms "central", "longitudinal", "transverse", "long", "wide", "thick", "upper", "lower", "front", "back", "left", "right", "vertical", "horizontal", "top", "bottom", "inner", "outer", "clockwise", "anticlockwise", "axial", "radial" and "circumferential" etc. are used to indicate orientations shown in the accompanying drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

In the present disclosure, unless otherwise clearly limited, the terms "installation", "interconnection", "connection" and "fixation" etc. are intended to be understood in a broad sense. For example, the "connection" may be a fixed connection, a removable connection or an integral connection; may be a mechanical connection, an electrical connection or a communication connection; may be a direct connection or an indirect connection using a medium; and may be a communication or an interaction between two elements, unless otherwise clearly specified and limited. Those of ordinary skill in the art may understand specific meanings of the above terms in the present disclosure based on a specific situation.

The implementation solutions of the present disclosure described above are not limited to the applications listed in the specification and implementations, but are absolutely applicable to various fields suitable for the present disclosure. Therefore, additional modifications can be easily made by those skilled in the art, and without departing from the general concepts defined by the claims and equivalent scopes thereof, the present disclosure is not limited to specific details and legends shown herein.

What is claimed is:

1. A power converter having a boosting mechanism with a multi-shaft vertically stepped turbine, comprising:
   a shaft sleeve, a water inlet end base, an outer sleeve, a plurality of first stepped turbine units, a plurality of first shaft rods, a plurality of second stepped turbine units, a plurality of second shaft rods and a third shaft rod, wherein:
   the water inlet end base is provided on an upper end of the outer sleeve;
   the shaft sleeve is provided inside the outer sleeve, and an upper end of the shaft sleeve extends out of the water inlet end base;
   the water inlet end base is provided with a plurality of water inlet holes;
   the first shaft rods, the second shaft rods and the third shaft rod are nested inside the shaft sleeve;
   the third shaft rod is provided in a central part of the shaft sleeve;
   the plurality of first shaft rods and the plurality of second shaft rods are alternately and uniformly distributed around the third shaft rod;
   the plurality of first stepped turbine units are alternately arranged relative to the plurality of second stepped turbine units, on the first shaft rods and the second shaft rods from top to bottom;
   the first stepped turbine units are drivingly connected to the first shaft rods, and are rotatably connected to the second shaft rods;
   the plurality of second stepped turbine units are arranged on the first shaft rods and the second shaft rods from top to bottom;
   the second stepped turbine units are drivingly connected to the second shaft rods, and are rotatably connected to the first shaft rods;
   each first stepped turbine unit is located above a respective one of the second stepped turbine units; and
   the second stepped turbine units and the first stepped turbine units rotate in opposite directions.

2. The power converter having the boosting mechanism with the multi-shaft vertically stepped turbine according to claim 1, wherein:
   each of the first stepped turbine units comprises:
      a first gear set, a first triangular stepped gear base, a first gear sleeve, and a plurality of first blades, the plurality of first blades are arranged on the first gear sleeve, the first gear set comprises a plurality of first internal gears, the plurality of first internal gears are arranged on the first triangular stepped gear base, and the first gear sleeve is sleeved on a periphery of the plurality of first internal gears;
   the first shaft rods respectively pass through the first internal gears;
   the second shaft rods respectively pass through a plurality of first connecting holes of each first triangular stepped gear base;
   the third shaft rod passes through a first central hole of each first triangular stepped gear base.

3. The power converter having the boosting mechanism with the multi-shaft vertically stepped turbine according to claim 2, wherein each first triangular stepped gear base comprises:
   a first base ring and a first stepped base;
   the first stepped base is provided on the first base ring;
   the first stepped base comprises a central part provided with the first central hole and a circumferential part uniformly provided with the plurality of first connecting holes;
   a first open groove is provided between each two adjacent first connecting holes; and
   each first internal gear is provided in each first open groove.

4. The power converter having the boosting mechanism with the multi-shaft vertically stepped turbine according to claim 2, wherein:
   each of the second stepped turbine units comprises:
      a second gear set, a second triangular stepped gear base, a second gear sleeve, and a plurality of second blades, the second gear set comprises a plurality of second internal gears, the plurality of second internal gears are arranged on the second triangular stepped gear base, the second gear sleeve is sleeved on a periphery of the plurality of second internal gears, and the plurality of second blades are arranged on the second gear sleeve;
   the second shaft rods respectively pass through the second internal gears;
   the first shaft rods respectively pass through a plurality of second connecting holes of each second triangular stepped gear base;
   the third shaft rod passes through a second central hole of each second triangular stepped gear base;
   the second blades are arranged in reverse symmetry with the first blades.

5. The power converter having the boosting mechanism with the multi-shaft vertically stepped turbine according to claim 4, wherein each second triangular stepped gear base comprises:
   a second base ring and a second stepped base;
   the second stepped base is provided on the second base ring;
   the second stepped base comprises a central part provided with the second central hole and a circumferential part uniformly provided with the plurality of second connecting holes;
   a second open groove is provided between each two adjacent second connecting holes; and
   each second internal gear is provided in each second open groove.

6. The power converter having the boosting mechanism with the multi-shaft vertically stepped turbine according to claim 4, further comprising:
   a second output mechanism, wherein the second output mechanism comprises a plurality of second helical gear sleeves; and
   the plurality of second helical gear sleeves are arranged on the second gear sleeves, respectively.

7. The power converter having the boosting mechanism with the multi-shaft vertically stepped turbine according to claim 2, further comprising:
   a first output mechanism, wherein the first output mechanism comprises a plurality of first helical gear sleeves; and
   the plurality of first helical gear sleeves are arranged on the first gear sleeves, respectively.

8. The power converter having the boosting mechanism with the multi-shaft vertically stepped turbine according to claim 1, wherein a top base is provided at upper ends of the first shaft rods, the second shaft rods and the third shaft rod, and a bottom base is provided at lower ends of the first shaft rods, the second shaft rods and the third shaft rod.

* * * * *